United States Patent [19]

Bushnell

[11] Patent Number: 5,450,468
[45] Date of Patent: Sep. 12, 1995

[54] METHOD OF RAPIDLY ASSESSING DAMAGE TO OUTSIDE LOOP PLANT

[75] Inventor: William J. Bushnell, St. Charles, Ill.

[73] Assignee: AT&T Corp., Murray Hill, N.J.

[21] Appl. No.: 55,425

[22] Filed: Apr. 29, 1993

[51] Int. Cl.6 .................. H04M 1/29; H04M 3/08; H04M 3/22

[52] U.S. Cl. ........................... 379/6; 379/27; 379/32; 379/34

[58] Field of Search ............... 379/1, 6, 10, 12, 22, 379/26, 27, 30, 32, 33

[56] References Cited

U.S. PATENT DOCUMENTS

| | | | |
|---|---|---|---|
| 4,479,196 | 10/1984 | Ferrer et al. | 364/900 |
| 4,839,917 | 6/1989 | Oliver | 379/33 X |
| 4,864,597 | 9/1989 | Fore | 379/27 X |
| 4,937,851 | 6/1990 | Lynch et al. | 379/6 |
| 5,018,189 | 5/1991 | Abrams et al. | 379/27 X |
| 5,111,492 | 5/1992 | Bliven et al. | 379/27 |

Primary Examiner—Stephen Chin
Assistant Examiner—Paul Loomis
Attorney, Agent, or Firm—Frederick B. Luludis

[57] ABSTRACT

From time-to-time, the telephone outside loop plant is severely damaged as a result of some catastrophe, such as a hurricane. To facilitate the repair and identification of such damage, a facility is provided which rapidly assesses and outputs to a terminal the extent of such damage. The rapid assessment is made possible by taking advantage of information that may be obtained from a number of different sources, in which the extent of the damage may be determined from such information.

12 Claims, 5 Drawing Sheets

FIG. 4

| DISTRIBUTION CABLE | NUMBER OF WORKING LINES | NUMBER OF NON WORKING LINES | KNOW STATUS | NUMBER OF ASSIGNED LINES |
|---|---|---|---|---|
| 1 | A | D | G | L |
| 2 | B | E | H | M |
| 3 | C | F | J | N |
| ○ | ○ | ○ | ○ | ○ |
| ○ | ○ | ○ | ○ | ○ |
| ○ | ○ | ○ | ○ | ○ |
| ○ | ○ | ○ | ○ | ○ |
| N | ○ | ○ | ○ | ○ |

150 151 152 153 154

METHOD OF RAPIDLY ASSESSING DAMAGE TO OUTSIDE LOOP PLANT

TECHNICAL FIELD

The invention relates to monitoring and quickly assessing damage to the telephone outside loop plant.

BACKGROUND OF THE INVENTION

Local exchange telephone companies monitor the status of a number of different types of elements forming their networks. These network elements include central office switching and transmission equipment. The transmission equipment includes outside plant facilities comprising various cables of telephone lines (outside loop plant) which, for the most part, connect the central office to the premises of telephone subscribers.

The outside loop plant is tested periodically typically using a so-called Automatic Line Insulation Test (ALIT). Since such tests are intrusive (service affecting), they are performed on idle telephone lines only, and at a time when most telephone lines are idle, i.e., during the middle of the night. One aspect of such testing is that a considerable amount of time is used to attach the test equipment to a loop. As such, only a few thousand idle telephone lines (loops) can be tested per hour. In a large central office switch, it may take several nights to test all of the loops originating from that switch.

If a catastrophe occurs, such as a hurricane, tornado, earthquake, flood, etc, the telephone company may use particular test equipment to assess the status of central office equipment and interoffice transmission facilities. However, if the catastrophe also causes extensive damage to the outside loop plant, then the telephone company has no way to rapidly assess and report the extent of that damage. In such an instance, the telephone company may either wait for the results of the nightly ALIT tests or wait for subscribers to call the telephone company and report problems.

In the first few hours after a catastrophe, it is advantageous for a local telephone company to quickly locate and assess outside loop plant damage for a number of reasons including, (a) coordination and dispatch of repair crews and (b) publicly reporting via public media (e.g., radio and/or television) the extent of the damage and the time it will take to repair such damage.

Currently, an electric utility company monitors its facilities to quickly identify damaged equipment and/or power lines. If the damage is extensive, then the utility company publicly announces the extent of the damage to assure the public that the utility is aware of the damage and is making repairs.

SUMMARY OF THE INVENTION

An advancement in the art of telephony is achieved by providing a facility which assesses rapidly the status of the telephone outside loop plant. This is achieved by performing, in accord with an aspect of the invention, transmission tests on selected pairs of wires, in which the selection is a function of the recent activity involving those pairs of wires. Advantageously, then, the assessment may be invoked to assess the level of damage caused by some catastrophe to the outside loop plant. In an illustrative embodiment of the invention, when invoked, the assessment facility collects the identities of the outside pair of wires forming the loop plant associated with a telephone switch and initializes the status of each such loop pair to a value of unknown. The facility then obtains information from a number of different sources to update an unknown status to either working or damaged, as the case may be. Such sources include, inter alia, calling information relating to telephone calls which are successfully completed and which are originated by or forwarded to telephone station sets served by the outside loop plant. The status of a loop pair may also be updated from unknown to either working or damaged based on the results obtained by performing a directed transmission test on that pair.

BRIEF DESCRIPTION OF THE DRAWING

In the FIGS.:

FIG. 2 is an example of one way the damage assessment system of FIG. 1 partitions the outside loop plant into a logical subplant;

FIGS. 3 and 4 are examples of respective status tables, that the damage assessment system of FIG. 1 generates during the process of assessing the damage to the outside loop plant;

DETAILED DESCRIPTION

Figure 1:
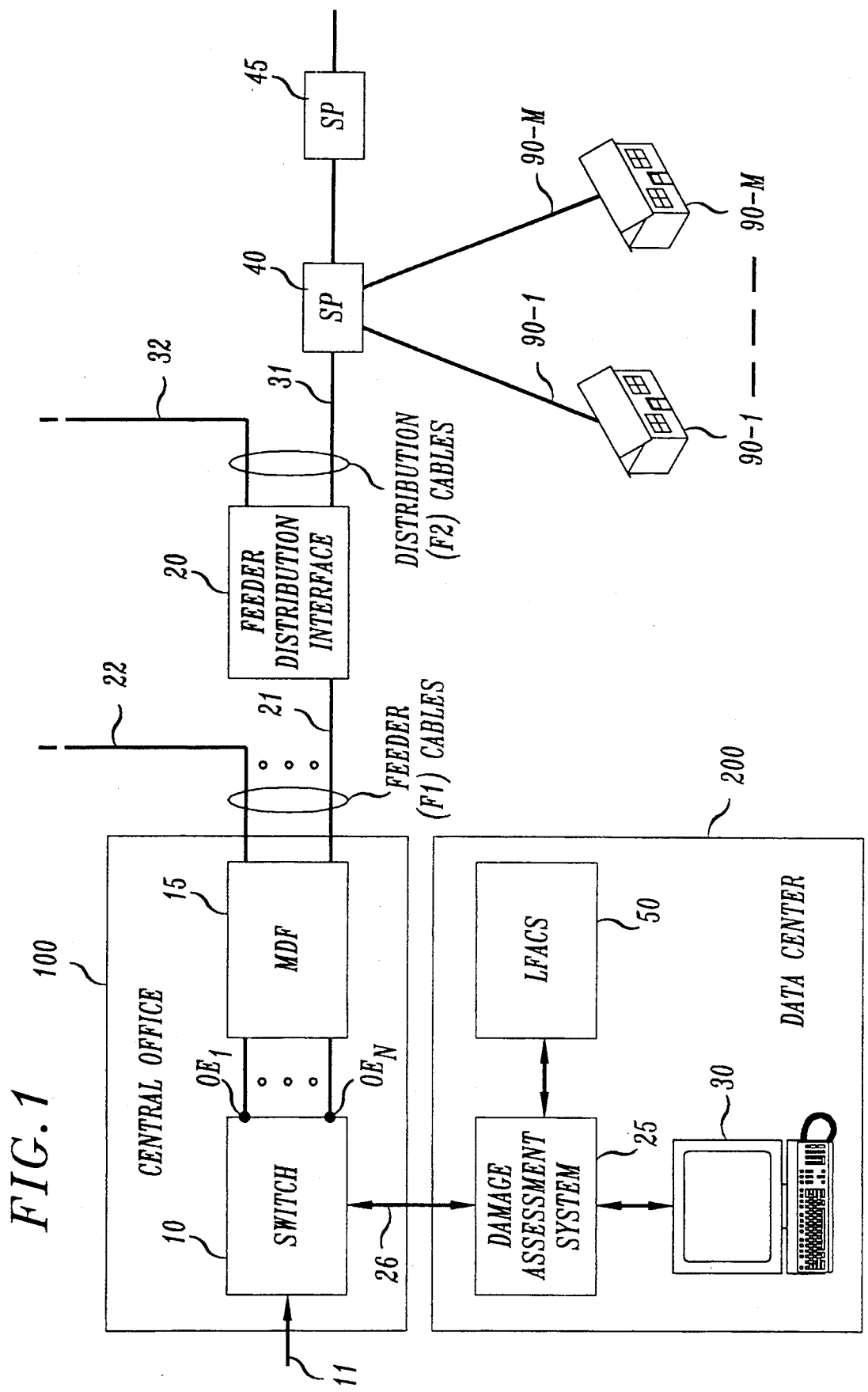
FIG. 1 illustrates an example of a local central office and its outside loop plant, in which the local central office is associated with a data center having a damage assessment system embodying the principals of the invention.

A telephone access network interconnecting, for example, a telephone central office and terminal equipment serving respective customer premises locations is conventionally referred to as the "local loop plant", as shown in FIG. 1. The local loop plant, more particularly, includes multiconductor cables, each of which includes a large number of pairs of wires with each pair of wires twisted together. Such cables are typically identified by their proximity to Central Office (CO) 100. For example, F1 cables 21 and 22 are often called "feeder" cables, since they connect to terminals located at one side of a Main Distributing Frame (MDF) 15 located in the CO. Terminals located at the opposite side of MDF 15 connect to respective Originating Equipment (OE), OE1 through OEN, associated with telephone switching equipment 10. The OEs, in turn, are associated with respective line, or port, circuits. A line circuit is the means by which dial tone is presented to a telephone station set which has been placed in an off-hook state and which is connected to line circuit via the outside loop plant.

The local loop plant also includes cross-connection facilities comprising feeder/distribution interfaces (FDIs) and Serving Pedestal (SPs). An FDI, e.g., FDI 20, in particular, is a device that is used to cross-connect a pair of wires associated with one cable, e.g., cable 21, with a pair of wires associated with another cable, e.g., cable 31. Similarly, a SP, e.g., SP 40, is a device that is used to cross-connect a pair of wires of a cable, e.g., cable 31, to drop wires, e.g., drop wires 91-1 connected to a customer premises 90-1.

Thus, a pair of wires interconnect a customer's premises and a particular OEi associated with a central office switch, e.g., switch 10, via one or more FDIs and a SP, in which OEi is associated with a particular telephone number i (TNi). When switch 10 receives a call and associated called telephone number via communications path 11, switch 10 interrogates a translation table to translate the called telephone number into the associated OE. Switch 10 then establishes a connection between path 11 and the OE and then causes the line circuit associated with that OE to transmit ringing voltage over the associated pair of wires to the called customer premises.

The local telephone company that operates central office 100 stores in an administrative database contained in center 200 detailed data specifying which wire pairs within the various cables, and which drop pairs, comprise any particular local loop. Typically, such data is maintained in a number of different database systems. One such database system is known as the Loop Facility Assignment and Control System (LFACS) 50. Briefly, LFACS 50 of data center 200 is an inventory of the outside loop plant facilities and is used to assign such facilities from the customer's premises to Main Distributing Frame (MDF) 15. That is, LFACS 50 is a database system which maintains a record for the local loop comprising the wire pairs in the feeder and distribution cables, and thus identifies the F1 pair, F2 pair, etc., serving a respective customer premises. Such LFACS records are also used to identify available pairs that may be used to provide telephone service to the premises of a new telephone customer.

It can be appreciated that damage to a feeder or distribution cable might affect most of the pain of wires forming the cable. Such damage may either sever or crush the pairs of wires in a cable. In either case, it is likely that the damage may affect (interrupt) the telephone service provided to those customers whose "telephone lines" are formed in part by the damaged cable. Accordingly, then, it can also be appreciated that a catastrophe, such as a severe hurricane, may damage a large number of feeder and/or distribution telephone cables. Disadvantageously, a local exchange carrier does not have presently the capability to rapidly assess and identify the extent of such damage.

I have recognized that following a catastrophe (disaster), the level of telephone calling traffic processed by a switch, e.g., switch 10, serving all or a part of an area affected by the catastrophe increases sharply. I have also recognized that such traffic provides information concerning the status of the outside loop plant, and that such information, when correlated with other information relating to the outside plant may be used, in accord with an aspect of the invention, to rapidly assess such damage.

Specifically, as a result of such increased traffic, switch 10 will most likely receive and complete successfully a portion of the calls originating from and terminating via the outside loop plant, thereby providing a way of identifying the outside loop plant that is capable of transporting telephone calls and, therefore, not damaged.

In addition, it is likely that switch 10 may receive "false" off-hook signals from a number of outside loop pairs and in response thereto return dial tone via the associated OEs. If switch 10 does not thereafter receive a dialed digit from one or more of those pairs, then switch 10 may store the identity of the OE(s) associated with such pair(s) as well as the assigned telephone number(s) in a so-called Receiver Off-Hook (ROH) table as an indication that the associated lines might be damaged.

A possible indication of damage to the outside loop plant may also be obtained from a table (list) of telephone lines that have been identified as being out of service. Such a list is typically created as a result of a telephone customer having a problem with his/her telephone line and calling, via a working telephone line, a so-called repair bureau service associated with switch 10 and reporting the problem. A repair bureau craftsperson may then request an ALIT for that telephone line. If the test fails, the craftsperson then directs switch 10 to store the identity of the failed telephone line in an Out-Of-Service (OOS) table. It is apparent that such trouble reporting increases during a catastrophe and may continue thereafter. Accordingly, the OOS and ROH tables may be used as sources of information to identify those loop pairs, and thus their associated outside loop cables, that might be damaged.

It can be appreciated that a forecaster may report the impendency of a catastrophe before it actually strikes a region, as is done with hurricanes. In such a situation, it is usually the case that a portion of the general population may be evacuated before the catastrophe strikes. If that is the case, then the telephone call traffic originating from the outside plant may not increase appreciably and, therefore, may not be an accurate indication of the condition of the outside plant. Thus, if the call traffic load on switch 10 is not appreciable, then directed ALIT tests may be performed with respect to particular outside plant pairs. That is, such tests must be selected in a predetermined manner so that the assessment of the damage to the outside plant may be completed in a timely manner, as discussed below.

Accordingly, the various sources of information which might be indicative of damage to the outside plant may be processed by Damage Assessment System (DAS) 25 to rapidly assess such damage, in which DAS 50 may be, for example, the model 3450 computer available from the NCR Corporation. To that end and in accord with an aspect of the invention, DAS 25, may be activated by a craftsperson in a conventional manner via terminal 30 when a catastrophe has struck or is about to strike the region served by the associated outside loop plane. When activated, DAS first divides the outside loop plant into a number of logical subplants. In an illustrative embodiment of the invention, such a division may be based on, for example, the number of telephone switches serving the outside plant. That is, if the outside plant is served by one telephone switch, then a logical subplant is equal to the outside plant. If the outside plant is served by two telephone switches, then two logical subplants are formed with each served by its respective telephone switch, and so on. Following the foregoing, DAS 25 then partitions each such subplant into its constituent feeder and distribution cables. DAS 25 then communicates with LFACS 50 to obtain from the latter the telephone number assigned to each loop pair contained in each distribution cable forming the associated subplant.

Figures 2, 3:
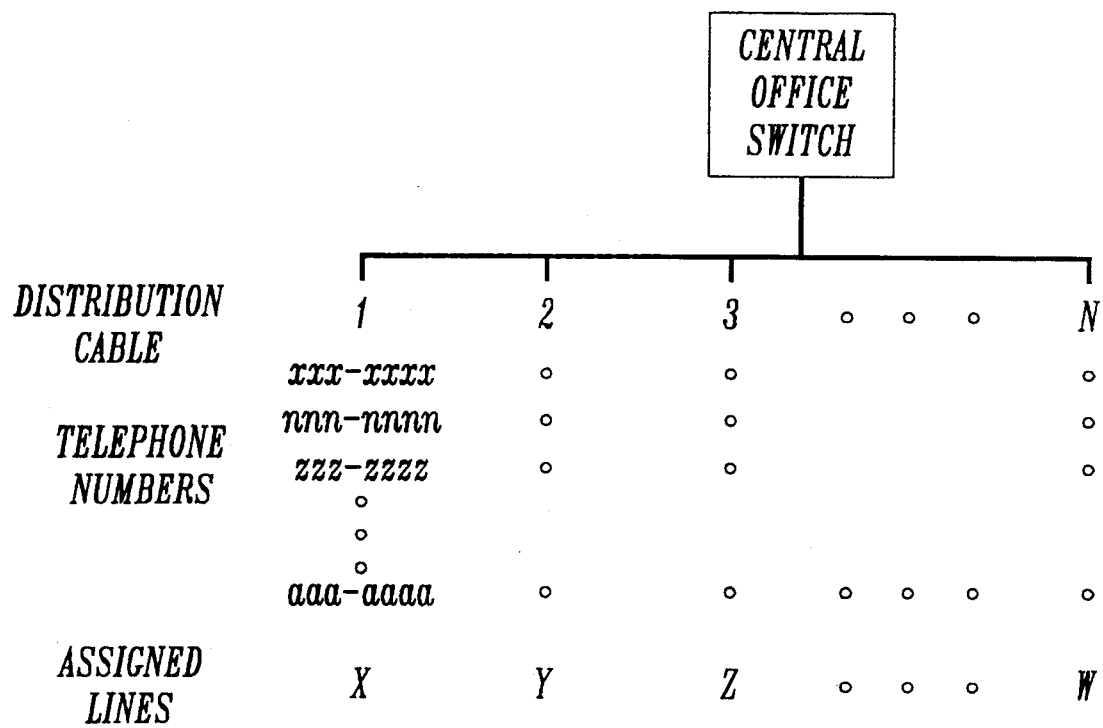

An example of such partitioning for a particular central office switch, e.g., switch 10 (FIG. 1), is shown in FIG. 2, which assumes that switch 10 is associated with N distribution cables. DAS 25 performs the partitioning by first listing each cable forming the subplant and then listing the working loop pairs that are in the cable, i.e., loops pairs that are assigned to telephone numbers (where xxx-xxxx, nnn-nnnn, zzz-zzzz, etc., represent respective telephone numbers in the FIG.). DAS 25 then totals the number of assigned loop pairs contained each cable, in which such totals are represented in the FIG. by X, Y, Z, etc.

Once a logical subplant has been created and the assigned loop pairs have been identified, then DAS 25 begins generating a telephone line status table, which is used to identify the status of each telephone line served by switch 10, as shown in FIG. 3. DAS 25 generates a line status table by listing sequentially the telephone numbers assigned to respective loop pairs (telephone lines) served by switch 10, in which such numbers are taken from FIG. 2. DAS 25 then initializes the status table by associating each telephone number listed therein with an unknown status. DAS 25 then instructs switch 10 via path 26 (FIG. 1) to notify DAS 25 each time a call is originated from (calling telephone number) or terminated at (called telephone number) the subplant and the call is successfully completed. When DAS 25 receives such notification, it then changes the status of the associated telephone number (calling (originating) or called (terminating), as the case may be, from unknown to working in the table 125.

DAS 25 next sends to switch 10 via path 26 a request for the Receiver-Off-hook (ROH) and Out-Of-Service (OOS) tables (lists) that are maintained by switch 10. DAS 25 then changes the status of those telephone numbers listed in table 125 and also listed in either the ROH or OOS lists from "unknown" to "trouble", as shown for the telephone number of NXX-0002 (where NXX represents the exchange code). Thereafter, DAS 25 periodically sends a request to switch 10 for updated ROH and OOS lists as a way of updating the status of the telephone numbers listed in table 125. In this way, DAS 25 may determine the status of the outside loop pairs assigned to those numbers.

When the number of updates in the ROH and OOS lists reaches a minimum, e.g. one or two, and DAS 25 finds that table 125 shows that the status of a majority of all of the assigned loop pairs forming one or more outside plant cables is still unknown, then DAS 25 instructs switch 10 to perform directed ALIT tests on particular cables. To identify such cables, DAS 25 summarizes the per line status data stored in table 125 for each outside cable, as shown in FIG. 4.

Specifically, DAS 25 summarizes the data stored in table 125 for each cable forming the logical subplant identified in FIG. 2. The summary includes the (a) number of working (operating) lines (loop pairs), (b) number of nonworking (nonoperating) lines, (c) number of lines whose status is other than unknown and (d) number of assigned lines, as shown in FIG. 4. The first and second numbers shown in columns 151 and 152 of table 150 are derived from the data stored in table 125. The third number in column 153 is actually the sum of the numbers listed in column 151 and 152. The number listed (stored) in column 154 is derived from the data listed in FIG. 2 for a cable. When DAS 25 completes the building of table 150, it then determines from the data stored therein whether the status of all of the lines (loop pairs) forming anyone of the cables listed in table 150 is still unknown. If DAS 25 finds that one or more such cables are listed in table 150 then DAS 25 directs switch 10 to perform an ALIT (i.e., directed ALIT) on one line of unknown status in each of those cables. If a line passes the ALIT then the status of the line is marked "working" in table 125. Otherwise, the line is placed out of service and its status is marked as being in "trouble". DAS 25 also updates the corresponding data listed in table 150.

Following such ALITs, DAS 25 checks table 150 to see if one or more cables listed therein has only one line whose status is known. If DAS 25 finds that to be the case, then it instructs switch 10 to perform an ALIT on one line of unknown status in each such cable. Similarly, DAS 25 updates tables 125 and 150 to include the data derived from the latter test(s). DAS 25 continues in this manner calling for ALIT tests until it knows the status of a majority of the wire pairs forming a cable.

(It is noted that during the time that such ALITs are being conducted, table 125 is still being updated using the data that is contained in the ROH and OOS tables maintained by switch 10. and results obtained from other sources.)

When the directed ALITs have been completed and DAS 25 has updated tables 125 and 150, then DAS 25, using table 150, estimates the total damage to the outside loop plant. Such estimating is done by multiplying the ratio of the number of nonworking lines and the number of lines whose status is known in a particular cable by the number of assigned lines in the cable, which may be stated by the following relationship;

$$ENDLCi = (No.\ of\ nonworking\ lines/known\ status) \times number\ of\ assigned\ lines$$

where ENDLCi is the estimated number of known damaged lines in cable i; and the values forming the right-hand side of the equation are the values in columns 152, 153 and 154 for cable i, respectively.

The estimated total damage is then determined by summing the values of each ENDLCi, as shown by the following relationship:

$$ENDLOP = \sum_{i=1}^{i} ENDLC_i$$

where ENDLOP is the estimated number of damaged lines in the outside plant and is, in accord with an aspect of the invention, an assessment of the damage to the outside plant.

Once the basic cable damage estimate has been formulated, then additional statistical techniques may be used to assess the accuracy of the estimate.

Specifically, DAS 25, in accord with an aspect of the invention, may be arranged to employ statistical techniques to assess such accuracy. For example, DAS 25 may be arranged so that it determines the sample "size" on which an estimate should be based. That is, DAS 25 determines the statistical variations or confidence intervals for the estimate. Moreover, DAS 25 may be further arranged so it outputs the estimate to terminal 30 only when the level of damage to a cable may be estimated within a certain degree of accuracy.

To that end, DAS 25 may be arranged so that it generates a level of confidence in the value that it generates for a given ENDLCi. If the generated level of confidence is below a predetermined threshold, e.g., 90%, then DAS 25 may continue to accumulate status data for that cable to increase the level of confidence in a subsequently generated ENDLCi value to the point where it meets or exceeds a predetermined threshold. At that point, DAS 25 may then output the identity of the cable and associated ENDLCi value to terminal 30. Finally, when the confidence level in the ENDLC value generated for each such cable meets the threshold, then DAS 25 may generate and output to terminal 30 the corresponding ENDLOP value. In addition, a craftsperson associated with switch CO 100 may then direct DAS 25 via terminal 30 to output the contents of tables 125 and 150, as a way of identifying individual lines that may have been possibly damaged by the catastrophe.

Figure 6:
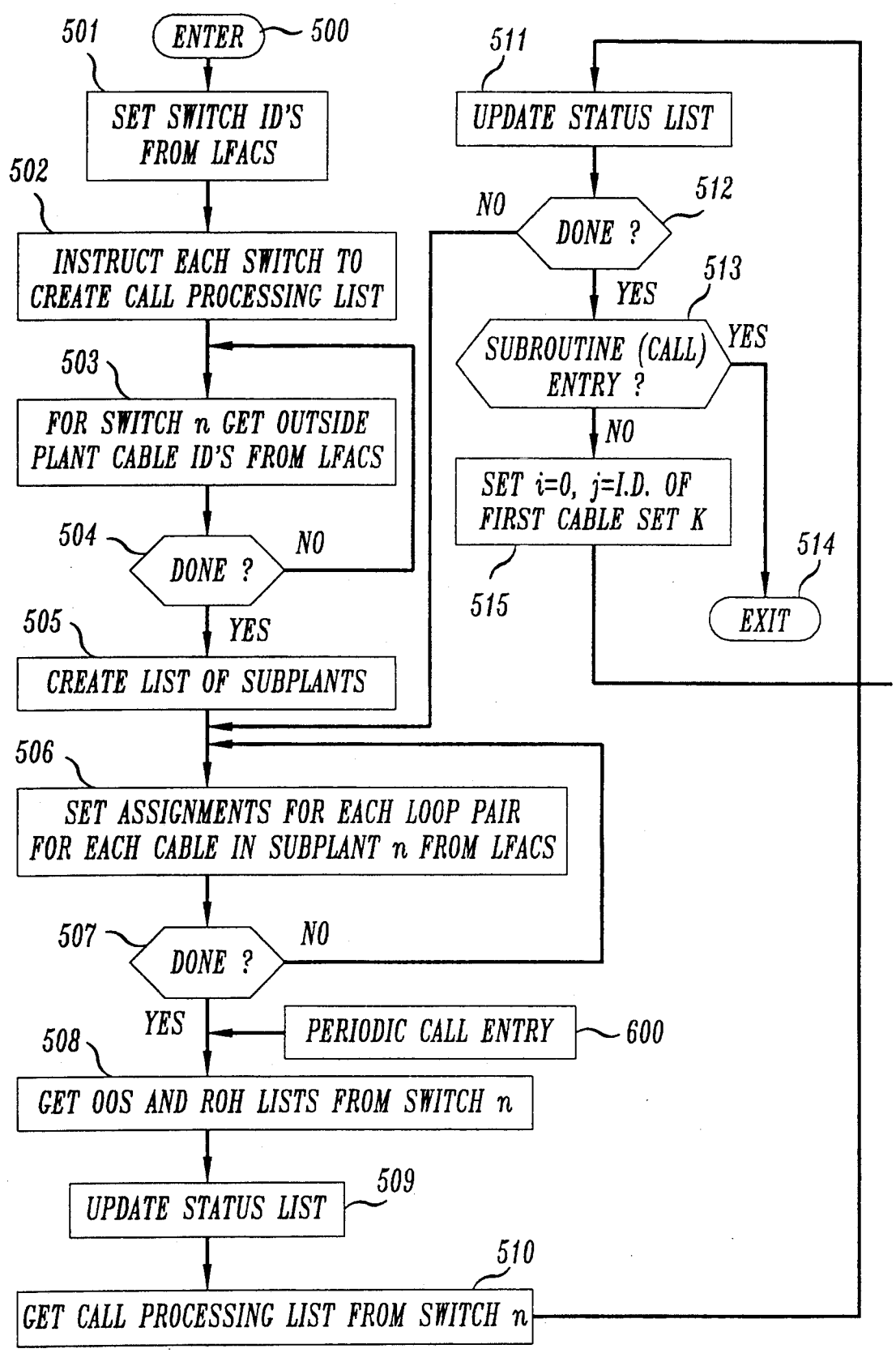
FIGS. 6 and 7 show in flow chart form the program which implements the principles of the invention in the Damage Assessment System (DAS) of FIG. 1.
Figure 7:
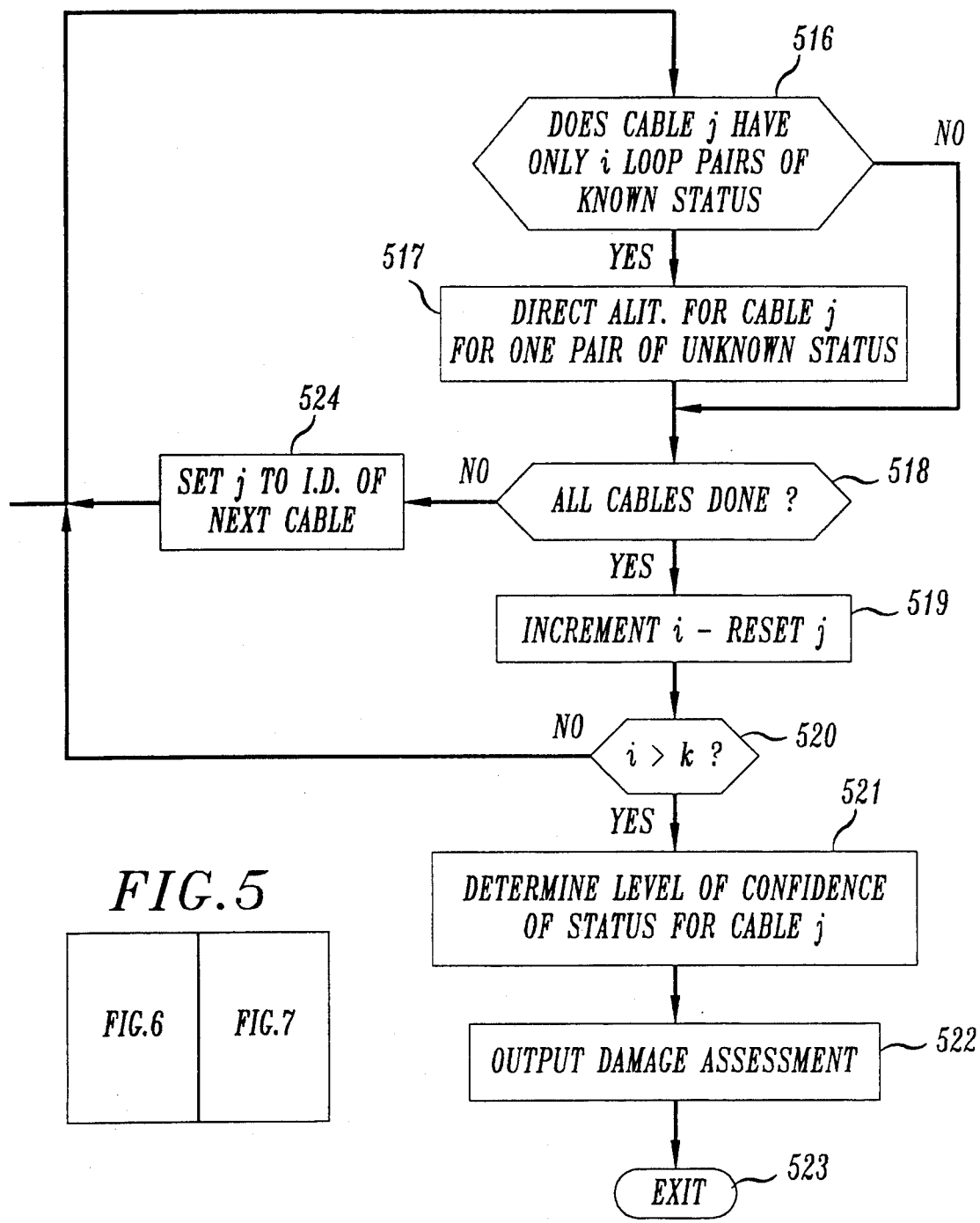
Figure 5:
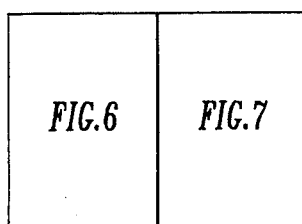
FIG. 5 shows how FIGS. 6 and 7 should be arranged with respect to one another.

Turning now to FIGS. 6 and 7, the program which drives DAS 25 is entered at entry block 500 responsive to a craftsperson activating DAS 25 via terminal 30. At that point the program proceeds to block 501 where it obtains the identities of the switches contained in the associated Central Office (CO) from LFACS 50. The program then proceeds to block 502 where it instructs each of those switches to begin maintaining a list of call processing activities involving their respect outside plant facilities. That is, a list of the telephone numbers associated with calls that are successfully forwarded to or originated from its outside plant. The program then proceeds to block 503 where it obtains from LFACS 50 the identity of each cable contained in the outside plant associated with each identified switch. At block 504, the program proceeds to block 505 if it has obtained all such cable identities. Otherwise, it returns to block 503 if it has not done so. At block 505, the program creates a logical subplant for each identified switch in the manner described above and then proceeds to block 506, where it obtains from LFACS 50 the assignments for each loop pair of each cable forming a logical subplant. The program then proceeds to block 507 where it checks to see if it has completed the foregoing task for cable i and proceeds to block 508 if has done so. Otherwise, it returns to block 506.

At block 508, the program creates a status list for each identified cable and marks each assigned loop pair in the list as having a status of unknown. The program then obtains the OOS and ROH lists from each identified switch and then, at block 509, updates the status list for the associated cable using the OOS and ROH lists in the manner described above. The program, at block 510, then requests the aforementioned call processing list from each switch n and then, at block 511, updates the status lists as was similarly done at block 509. At block 512, the program proceeds to block 513 if it finds that it has completed such updating (for the present entry). Otherwise, it returns to block 508 to update the status of the loop pairs in the cables associated with next switch i. At block 513, the program exits via block 514 if it had been entered via block 600 as a subroutine call. Otherwise, it proceeds to block 515, where it respectively sets two variables i and j to a value of zero and identity of the first cable in the first logical subplant. It also sets a variable k to a particular value, e.g., a value derived from the average number of loop pairs in a cable.

The program then proceeds to block 516 where it determines if cable j has only i loop pairs of known status (i.e., working or trouble) and proceeds to block 517 if it finds that to be the case. Otherwise, it proceeds to block 518. At block 517, the program directs the ALIT facility to perform a test on one of the loop pairs having a status of unknown in cable j. At block 518, the program then checks to see if it has completed processing all cables for the current value of i and proceeds to block 519 if that is the case. Otherwise, it proceeds to block 524. At block 519, the program increments i and proceeds to block 520 where it checks to to see if the value of i exceeds the value of k. If that is the case, then the program proceeds to block 521 where it calculates the level of confidence it has in the current status of the loop pairs that it has determined for cable j and then proceeds to block 522 to output the damage assessment to terminal 30. The program then exits via block 523. At block 524, the program sets j to equal the identity of the next cable that needs to be processed.

It is noted that block 521 could be arranged so that if the confidence level for the damage assessment does not meet a predetermined value, then directed ALITs may be continued for that cable until the level of confidence in the damage assessment for that cable reaches a predetermined threshold. For example, the value of k may be increased so that additional ALITS may be performed on that cable by retuning to block 516.

The foregoing is merely illustrative of the principles of the invention. Those skilled in the art will be able to devise numerous arrangements, which, although not explicitly shown or described herein, nevertheless embody those principles that are within the spirit and scope of the invention. For example, DAS 25 may be arranged so that it monitors the Common Channel Signaling (CCS) network (not shown) that is used by the switches in a network to transmit and receive messages relating to the processing of calls. These messages contain the telephone number of the originating and/or terminating line. That is, DAS 25 may be arranged so that it receives notification of successful originating or terminating interoffice calls by monitoring the CCS trunk signaling messages that switch 10 sends and receives over the CCS network. As a further example, the number of per call messages that switch 10 sends to DAS 25 may be reduced if switch 10 is also arranged to generate a copy of line status table 125. As such, switch 10 need only notify DAS 25 of changes in the status of various telephone lines. As such, switch 10 may limit the number of times it notifies DAS 25 of a successful call completion over a particular telephone line to one. As a further example, once the inventive damage assessment arrangement has accumulated a sufficient number of samples of traffic status and ALITs to formulate a cable damage assessment within certain levels of confidence, then DAS 25 may suspend additional ALITs on that cable. This feature would allow DAS 25 to direct switch 10 to focus ALITs on other distribution cables.

I claim:

1. A method of assessing the level of damage done to at least one outside loop plant cable, said cable comprising a plurality of pairs of wires, individual ones of said pairs of wires forming respective local loop pairs associated with respective telephone station sets, said method comprising the steps of
    determining which ones of said pairs of wires are indicative of either an out-of service or permanently off-hook condition as a result of said damage and associating such pairs of wires with a status of not working,
    determining which ones of said pairs of wires are working based on telephone calls being successfully placed to and from their respective telephone station sets and associating such pairs of wires with a status of working, and
    performing transmission tests on selected ones of said pairs of wires whose status cannot be determined as a way of determining the status of the selected ones of said pairs of wires.

2. The method set forth in claim 1 wherein said outside loop plant includes a plurality of cables, wherein individual ones of said outside loop plant cables being associated with respective telephone switches, and wherein said method further comprises the step of logically partitioning said outside loop plant cables into respective outside loop subplants associated with their respective ones of said switches to facilitate said assessment.

3. The method set forth in claim 1 further comprising the step of prompting said switches to accumulate said calling information relating to their associated outside loop subplants.

4. The method set forth in claim 1 wherein said method includes the steps of outputting the level of damage to said cable to an output terminal and outputting a value indicative of the accuracy of such level of damage to said terminal.

5. The method set forth in claim 2 wherein said step of performing includes the steps of
 (a) for each of said plurality of cables, if only i pairs of wires have a known status then performing said transmission test on one of those pairs of wires having an unknown status, where the initial value of i=0, and
 (b) incrementing i and repeating step (a) if the value of i has not reached a predetermined value.

6. A method of assessing rapidly the level of damage done to at least one outside loop plant cable comprising a plurality of pairs of wires, individual ones of said pairs of wires being assigned to serve respective premises, said method comprising the steps of
 determining which of said individual ones of said pairs of wires have a status of working or not working based on information supplied by ones of a plurality of sources of such information, said sources including (a) an out-of-service list identifying those of said individual ones of said pairs of wires that are out of service, (b) receiver-off-hook list identifying those of said individual ones of said pairs of wires associated with telephone stations sets that are in a permanent off-hook state, and (c) respective calling information,
 assigning a status of unknown to those of said ones of said pairs of wire whose working or nonworking status cannot be determined from said information,
 performing transmission tests on those of said pairs of wires whose status cannot be determined from said information to determine if such status may be changed to working or nonworking status, and
 outputting to a terminal data indicative of the level of damage done to said one cable.

7. The method set forth in claim 6 wherein said outside loop plant includes a plurality of outside loop plant cables, wherein individual ones of said outside loop plant cables being associated with respective telephone switches, and wherein said method further comprises the step of logically partitioning said outside loop plant cables into respective outside loop subplants associated with their respective ones of said switches to facilitate said assessment.

8. The method set forth in claim 6 further comprising the step of causing said switches to accumulate said calling information relating to their associated outside loop subplants.

9. The method set forth in claim 6 wherein said step of outputting includes the step of generating a value indicative of the accuracy in the status of the pairs of wires forming said at least one cable and outputting said value to said terminal.

10. The method set forth in claim 6 wherein said step of outputting includes the step of generating a value indicative of the accuracy of said data and continuing said step of directing if said value does not meet a predetermined threshold.

11. The method set forth in claim 7 wherein said step of directing includes the steps of
 (a) for each of said plurality of cables, if only i pairs of wires have a status known then performing said transmission test on one of those pairs of wires having an unknown status, where the initial value of i—0, and
 (b) incrementing i and repeating step a if the value of i has not reached a predetermined value.

12. The method set forth in claim 6 further comprising the step of compiling said out-of-service and receiver-off-hook lists after said damage has occurred.

* * * * *